US009183432B2

(12) United States Patent
Sasatani et al.

(10) Patent No.: US 9,183,432 B2
(45) Date of Patent: Nov. 10, 2015

(54) PEOPLE COUNTING DEVICE AND PEOPLE TRAJECTORY ANALYSIS DEVICE

(71) Applicant: HITACHI, LTD., Tokyo (JP)

(72) Inventors: So Sasatani, Tokyo (JP); Yoshikuni Mae, Tokyo (JP); Ryou Yumiba, Tokyo (JP)

(73) Assignee: Hitachi Industry & Control Solutions, Ltd., Ibaraki (JP)

( * ) Notice: Subject to any disclaimer, the term of this patent is extended or adjusted under 35 U.S.C. 154(b) by 3 days.

(21) Appl. No.: 14/270,531

(22) Filed: May 6, 2014

(65) Prior Publication Data

US 2014/0348382 A1  Nov. 27, 2014

(30) Foreign Application Priority Data

May 22, 2013  (JP) ................................ 2013-108154

(51) Int. Cl.
*G06K 9/00* (2006.01)
*G06T 7/00* (2006.01)

(52) U.S. Cl.
CPC ........ *G06K 9/00369* (2013.01); *G06K 9/00778* (2013.01); *G06T 7/0042* (2013.01); *G06T 2207/30196* (2013.01); *G06T 2207/30242* (2013.01)

(58) Field of Classification Search
CPC .... G06K 2209/21; G06T 7/20; G06T 7/2006; G06T 7/2013; G06T 7/202; G06T 7/2026; G06T 7/2033; G06T 7/2046; G08B 13/19604; G08B 13/19606; G08B 13/19608; G08B 13/19613
See application file for complete search history.

(56) References Cited

U.S. PATENT DOCUMENTS

| 7,257,237 | B1 * | 8/2007 | Luck et al. ..................... 382/103 |
| 7,596,241 | B2 * | 9/2009 | Rittscher et al. .............. 382/103 |
| 8,564,534 | B2 * | 10/2013 | Leyvand et al. ............... 345/156 |
| 8,923,556 | B2 * | 12/2014 | Zhang et al. ................... 382/103 |
| 2009/0033745 | A1 * | 2/2009 | Yeredor et al. ................. 348/152 |
| 2013/0051624 | A1 * | 2/2013 | Iwasaki et al. ................. 382/103 |
| 2013/0064425 | A1 * | 3/2013 | Sagawa et al. ................. 382/103 |

FOREIGN PATENT DOCUMENTS

| JP | 2001-056853 A | 2/2001 |
| JP | 2011-086045 A | 4/2011 |

OTHER PUBLICATIONS

Ogawa et al., "Tracking Camera System by Master-Slave Corresponding to Real Space", Ninth Image Sensing Symposium, pp. 211-216, Jun. 2003.

* cited by examiner

*Primary Examiner* — Avinash Yentrapati
(74) *Attorney, Agent, or Firm* — Mattingly & Malur, PC

(57) ABSTRACT

The people counting device includes an image acquisition unit to acquire an image from an imaging device, a head coordinate detection unit to detect a head coordinate of a target person from the image, a foot coordinate estimation unit to estimate a foot coordinate of the target person from the detected head coordinate, an individual region detection unit to perform region segmentation of the image and to give an attribute to each of regions, a foot coordinate correction unit to determine whether the target person overlaps another person based on the given attribute and to correct the foot coordinate of the target person estimated by the foot coordinate estimation unit when the persons are determined to overlap each other, a foot coordinate region inside/outside determination unit to determine whether the foot coordinate exists in a detection region set in the image, and a people counting unit to count foot coordinates.

11 Claims, 15 Drawing Sheets

PEOPLE COUNTING DEVICE AND PEOPLE TRAJECTORY ANALYSIS DEVICE

BACKGROUND OF THE INVENTION

1. Field of the Invention

The present invention relates to a people counting device which performs image recognition of persons in a monitor camera and grasps the number of the persons by the image recognition, and a people trajectory analysis device capable of analyzing a trajectory of a person.

2. Description of Related Art

There is an increasing need for a system for realizing safety management or traffic census in commercial facilities or public facilities by using information of the number of persons present in a detection region obtained by image recognition from an image of a camera. For example, a typical example of this system using the information of the number of persons is a tailgating detection system for determining whether or not there is an accompanied person before individual authentication in a room entry/exit system, or a person detection system for determining whether or not there is a person in an off-limits place. These systems are for a state in which the number of persons in the detection region is relatively small. A crowded degree estimation system for estimating a crowded degree by counting the rough number of persons is also a typical example of the system using the information of the number of persons. This system is for a state in which the number of persons in the detection region is large. That is, the people counting for the quiet state is required to have high accuracy, while the people counting for the crowded state is not required to have high accuracy as compared with the quiet state.

In order to increase the effectiveness of the people counting system and to reduce the cost, one camera and one signal processing device are required to cover both the quiet time and the crowded time.

JP-A-2011-86045 (Patent Literature 1) discloses that in order to remove the influence of overlap between persons, a special camera is set just above persons, and people counting is realized by counting the number of heads of the persons in a detection region previously set in an image.

However, such a camera is usually dedicated for people counting, and the cost becomes high. Thus, a people counting technique using an image of a general monitor camera is required.

In a people counting technique using a monitor camera image, similarly to the dedicated camera, a head which is relatively easy to be detected in a human body is usually detected in order to detect a person in the image. However, since the monitor camera is installed while the depression angle is obliquely downward, a head position and a foot position on the floor are different between a camera image coordinate system and a real world coordinate system. Thus, it is necessary to take consistency between the detected head position and the detection region set in the image. Thus, in the people counting technique using the image of the monitor camera, after the foot position is estimated from the head position of a person in the image, it is determined whether or not the foot position exists in the set detection region, and the people counting is realized by counting the number of feet which are determined to exist in the detection region.

JP-A-2001-056853 (Patent Literature 2) discloses a technique for estimating a foot position from a head position of a person in an image, in which the foot position is estimate by taking consistency between a lower end of a region, which appears to be a human body, detected from the image by background subtraction and the detected head position.

Besides, there is also a technique in which a head position in a three-dimensional space is derived from a head position on an image detected by geometric conversion, a position just below that by an average height is assumed to be a foot position in the three-dimensional space, and a foot position on the image is estimated by again using the geometrical conversion.

According to Non Patent Literature 1 (Toshizo Ogawa, Hironobu Fujiyoshi, "Tracking Camera System by Master-Slave Corresponding to Real Space", Ninth Image Sensing Symposium, P. 211-216, June, 2003), a rough foot position can be estimated in a crowded state in which overlap between persons constantly occurs.

According to the technique of Patent Literature 2, in the quiet state in which the frequency of overlap between persons is low, the foot position can be accurately estimated without being influenced by a difference between the heights of the persons or postures. However, in the crowded state in which overlap between persons constantly occurs, there is a problem that a region which appears to be a human body detected by the background subtraction becomes giant by combination of plural persons, and the estimated foot position is significantly different from a true value.

According to the technique of Non Patent Literature 1, also in the quiet state in which the frequency of overlap between persons is low, the foot position is estimated by using the average height. Thus, the foot position of a person, such as a child, much different from the standard body type or a person sitting in the detection region is significantly different from the true value, and there is a problem that the accuracy of the foot estimation is low as compared with the technique of Patent Literature 2.

SUMMARY OF INVENTION

The invention is made to solve the above problems and has an object to provide a people counting device in which in people counting using a monitor camera, feet are accurately estimated in a quiet time state in which the frequency of overlap between persons in a detection region is low, and feet are roughly estimated in a crowded time state in which overlap between persons constantly occurs, so that the number of persons is counted with high accuracy at the quiet time and the rough number of persons can be counted at the crowded time, and a people trajectory analysis device capable of analyzing a trajectory of a person.

In order to achieve the object, a people counting device of the invention includes an image acquisition unit configured to acquire an image from an imaging device (for example, a camera 20), a head coordinate detection unit configured to detect a head coordinate of a target person from the image, a foot coordinate estimation unit configured to estimate a foot coordinate of the target person from the detected head coordinate, an individual region detection unit configured to perform region segmentation of the image and to give an attribute to each of regions, a foot coordinate correction unit configured to determine whether the target person overlaps another person based on the given attribute and to correct the foot coordinate of the target person estimated by the foot coordinate estimation unit when the persons are determined to overlap each other, a foot coordinate region inside/outside determination unit configured to determine whether the foot coordinate exists in a detection region set in the image, and a people counting unit configured to count foot coordinates determined to exist in the detection region by the foot coordinate region inside/outside determination unit.

According to the invention, in the people counting using the monitor camera, the number of persons is counted with high accuracy at the quiet time when there are a small number of overlaps between persons, and the rough number of persons can be counted at the crowded time when there are a large number of overlaps between persons.

DESCRIPTION OF EMBODIMENTS

Hereinafter, specific embodiments of the invention will be described in detail with reference to the drawings.

Embodiment 1

Figure 1:
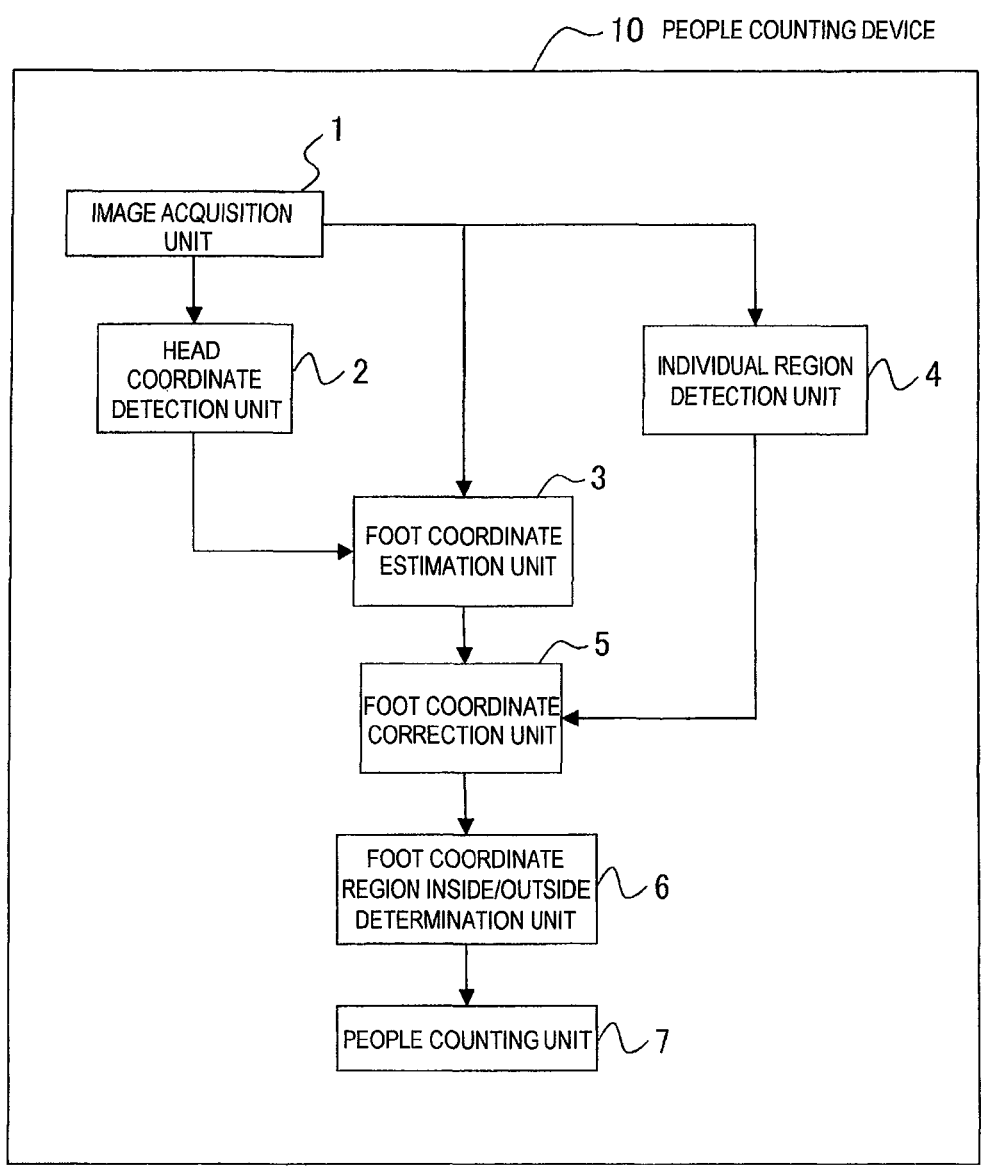
FIG. 1 is a view showing a functional block of embodiment 1 of the invention.

FIG. 1 is a view showing a functional block of embodiment 1 of the invention. A people counting device 10 shown in FIG. 1 is a people counting device in which image recognition of persons in a camera 20 (imaging device, see FIG. 2) is performed, and the number of the persons is grasped by the image recognition.

The people counting device 10 includes an image acquisition unit 1 to acquire an image from at least one camera 20 (see FIG. 2A), a head coordinate detection unit 2 to detect a head position of a person on the image, a foot coordinate estimation unit 3 to estimate a foot position from the head position of the person, an individual region detection unit 4 to individually detect regions including persons on the image based on an image feature quantity, a foot coordinate correction unit 5 to correct the foot position estimated by the foot coordinate estimation unit 3 by using the individual region detected by the individual region detection unit 4, a foot coordinate region inside/outside determination unit 6 to determine whether or not the foot position of the person exists in a detection region set on the image, and a people counting unit 7 to count the number of persons whose foot positions exist in the detection region set on the image. Incidentally, the people counting device 10 is realized by a calculator including an arithmetic device to perform operations of the respective units, a main storage device and an external storage device.

Hereinafter, the details of the respective units will be described.

Image Acquisition Unit 1

The image acquisition unit 1 acquires an input image at a specified time period from the camera 20 mounted near the ceiling.

Figure 2A:
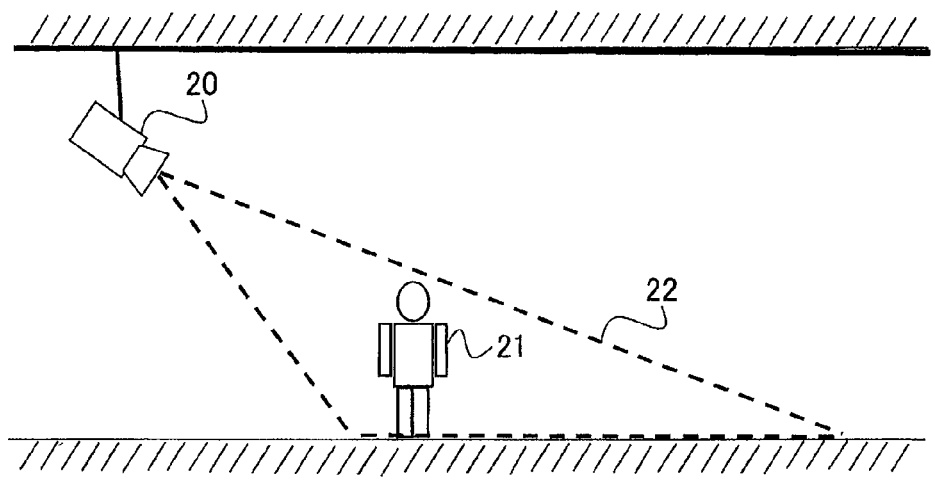
FIGS. 2A and 2B are views for explaining an image acquired by an image acquisition unit.
Figure 2B:
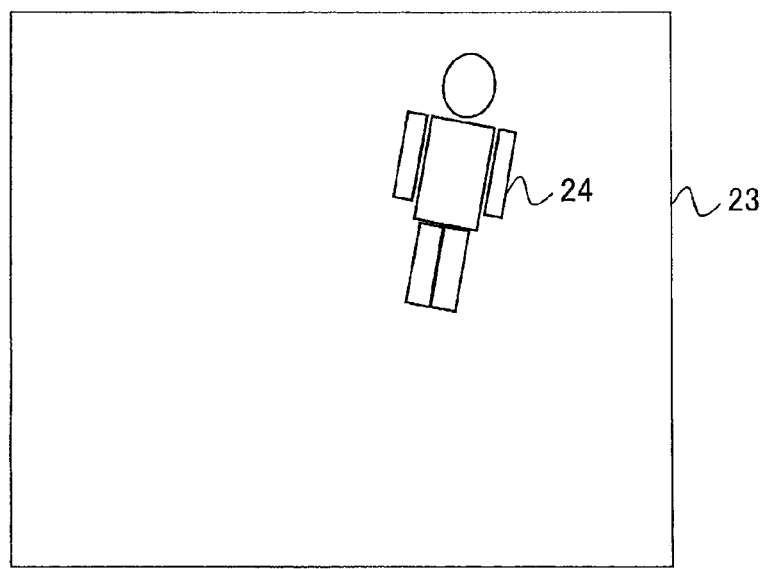

FIGS. 2A and 2B are views for explaining an image acquired by the image acquisition unit 1. FIG. 2A shows an example of a state in which in a space, the camera 20 captures an object 21 in a view angle 22 of the camera 20, and FIG. 2B is a view showing an input image 23. The camera 20 is installed at a position higher than the head of the person, and the camera 20 captures the entire body of the object 21 in the view angle of the camera. In FIG. 2B, the input image 23 is the input image acquired by the image acquisition unit 1 from the camera 20, and a person 24 indicates the object 21 in the input image. Incidentally, a general monitor camera can be used as the camera 20.

Head Coordinate Detection Unit 2

Figure 3:
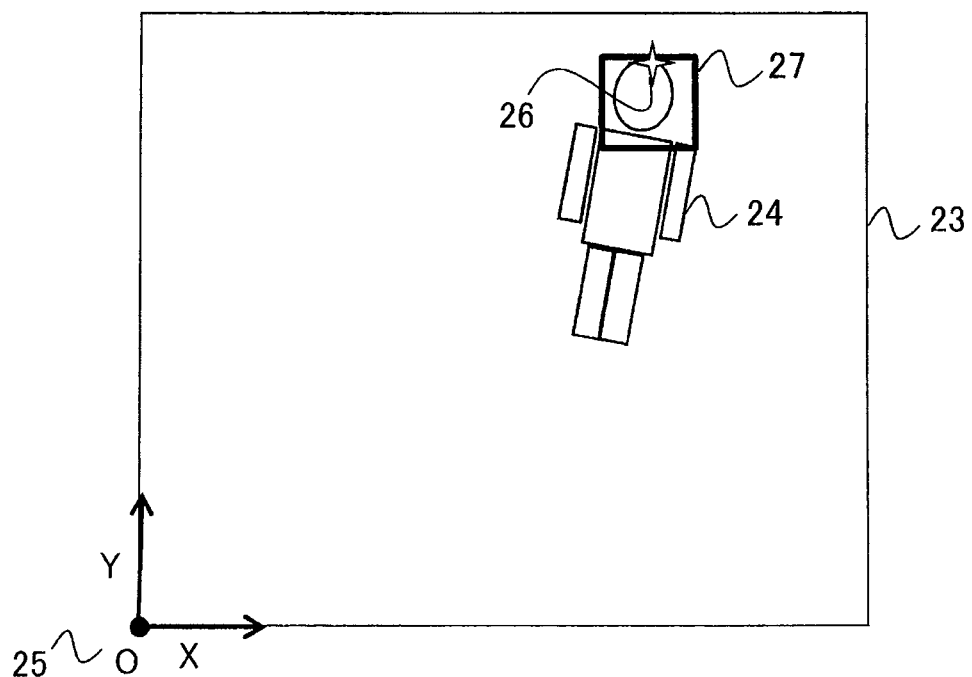
FIG. 3 is a view for explaining a head coordinate detection unit.

FIG. 3 is a view for explaining the head coordinate detection unit 2. When receiving the input image 2, the head coordinate detection unit 2 detects a face of the person 24 by determining whether the reliability of being the head is high or low based on Haar-like feature quantity of Non Patent Literature 2 (P. Viola and M. Jones, "Robust Real-time face detection", International Journal of Computer Vision, Vol. 57, no. 2, pp. 137-154, 2004) with respect to detection frames 27 of all positions and sizes in the input image 23 shown in FIG. 3, and acquires a head coordinate 26 on image coordinate axes 25 from the detected face. With respect to the acquisition of the head coordinate 26 from the detected face, for example, the head coordinate is easily obtained by using the image coordinate of the center of the upper side of the detection frame 27 in which the person 24 is detected. Incidentally, other than Non Patent Literature 2, another method may be used as long as the method can determine whether the inside of the detection frame 27 represents the head or a part other than the head.

Foot Coordinate Estimation Unit 3

Figure 4A:
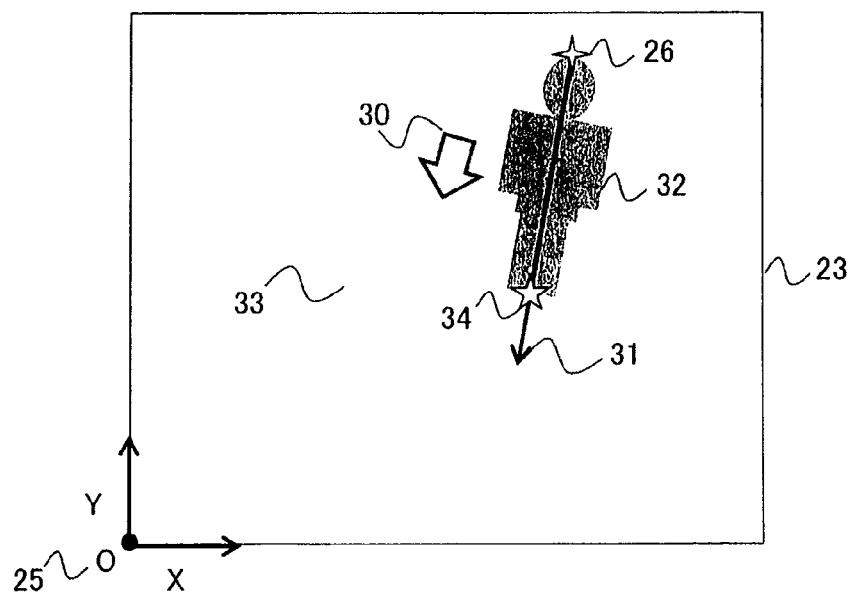
FIGS. 4A and 4B are views for explaining a foot coordinate estimation unit.
Figure 4B:
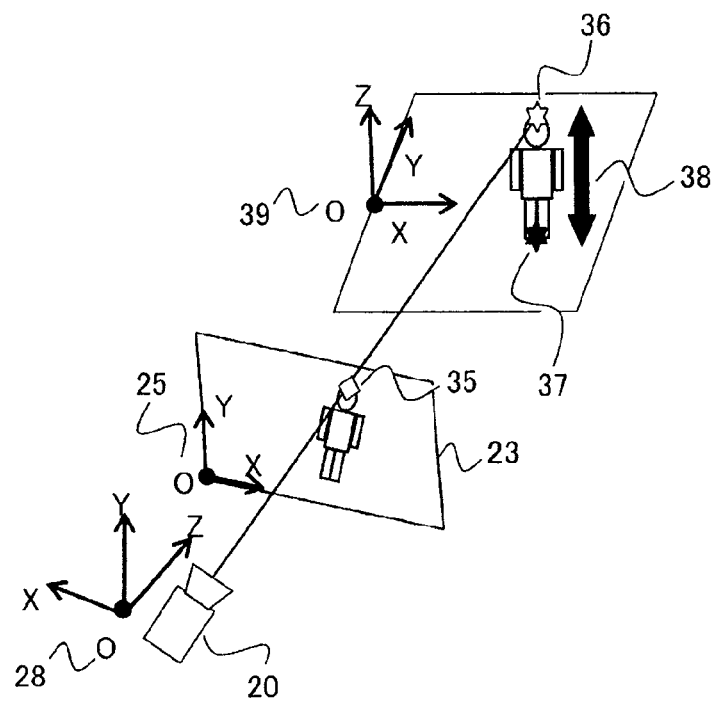

FIGS. 4A and 4B are views for explaining the foot coordinate estimation unit 3. FIG. 4A is a view for explaining detection of a foot coordinate 34 in the input image 23, and FIG. 4B is a view showing an estimation method of a vertical direction 30 shown in FIG. 4A. The foot coordinate estimation unit 3 extends a straight line 31 in the vertical direction 30 shown in FIG. 4A, in which the person appears to contact the floor, from the head coordinate 26 on the image coordinate axes 25 (image coordinate axis system) detected by the head coordinate detection unit 2, and detects, as the foot coordinate 34, an intersection between the straight line 31 and a boundary line between a human body region 32 and a background region 33 detected by background subtraction or the like.

The estimation method of the direction 30 in the foot coordinate estimation unit 3 will be described with reference to FIG. 4B. Incidentally, it is assumed that camera parameters, such as a height of the camera 20, a depression angle, a view angle and a focal distance of a lens of the camera 20, required for estimation of the direction 30, are previously prepared.

In the estimation method of the direction 30, $(x_{ch}, y_{ch}, z_{ch})$ of a head coordinate 35 on camera image coordinate axes 28 (camera image coordinate axis system) shown in FIG. 4B is uniquely determined by Expression (1) with respect to $(u_h, v_h)$ of the head coordinate 26 on the image coordinate axes 25.

$$\begin{bmatrix} x_{ch} \\ y_{ch} \\ z_{ch} \end{bmatrix} = \begin{bmatrix} u_c \\ v_c \\ f \end{bmatrix} - \begin{bmatrix} u_h \\ v_h \\ 0 \end{bmatrix} \quad (1)$$

In Expression (1), $(u_c, v_c)$ denotes the center coordinate of the image 23, and f denotes the focal distance of the lens of the camera. Besides, $(x_{wh}, Y_{wh}, z_{wh})$ of a head coordinate 36 on real world coordinate axes 39 (real world coordinate axis system) is uniquely determined by Expression (2) with respect to $(x_{ch}, y_{ch}, z_{ch})$ of the head coordinate 35 on the camera image coordinate axes 28.

$$\begin{bmatrix} x_{wh} \\ y_{wh} \\ z_{wh} \end{bmatrix} = \alpha R^T \begin{bmatrix} x_{ch} \\ y_{ch} \\ z_{ch} \end{bmatrix} + T \quad (2)$$

In Expression (2), R denotes a rotation matrix for converting the real world coordinates to the camera coordinates, and is uniquely determined by Expression (3) with respect to a pitch rotation matrix $R_x$ obtained from the camera parameters, a yaw rotation matrix $R_y$, and a roll rotation matrix $R_z$. Incidentally, $R^T$ denotes a transposed matrix of R.

$$R = R_Z R_X R_Y \quad (3)$$

In Expression (2), T denotes a parallel movement vector represented as $T=[00C_h]$ with respect to the height $C_h$ of the camera on the real world coordinates. Besides, in Expression (2), since $z_{wh}$ is a z coordinate of the head coordinate on the real world coordinate axes, the value is inevitably 1 or more. When $z_{wh}$ is determined to be an arbitrary real number not lower than 1, a real number $\alpha$ can be easily obtained. Here, it is assumed that $z_{wh}$ is an average height 38, and the real number $\alpha$ is obtained by solving Expression (2) with respect to the real number $\alpha$.

In $(x_{wh}, y_{wh}, z_{wh})$ of the head coordinate 36 on the real world coordinate axes 39, if it is assumed that the target person stands vertically to the floor surface, and the foot exists just under the head, then $(x_{wf}, y_{wf}, z_{wf})$ of a foot coordinate 37 located vertically downward from the head coordinate 36 on the real world coordinate axes 39 is uniquely determined by Expression (4).

$$\begin{bmatrix} x_{wf} \\ y_{wf} \\ z_{wf} \end{bmatrix} = \begin{bmatrix} x_{wh} \\ y_{wh} \\ 0 \end{bmatrix} \quad (4)$$

When the inverse transforms of Expression (2) and Expression (1) are sequentially performed with respect to $(x_{wf}, y_{wf}, z_{wf})$ of the foot coordinate 37 determined by Expression (4), $(u_f, v_f)$ of the foot coordinate 34 on the image coordinate axes 25 is uniquely determined. The direction 30 can be estimated by obtaining an inclination between $(u_h, v_h)$ of the head coordinate 26 on the image coordinate axes 25 and $(u_f, v_f)$ of the foot coordinate 34.

The coordinates explained in FIGS. 4A and 4B are summarized as follows:

$(u_h, v_h)$ of the head coordinate 26 on the image coordinate axes 25;

$(u_f, v_f)$ of the foot coordinate 34 on the image coordinate axes 25;

$(x_{ch}, y_{ch}, z_{ch})$ of the head coordinate 35 on the camera image coordinate axes 28;

$(x_{wh}, y_{wh}, z_{wh})$ of the head coordinate 36 on the real world coordinate axes 39;

$(x_{wf}, y_{wf}, z_{wf})$ of the foot coordinate 37 on the real world coordinate axes 39.

Individual Region Detection Unit 4

Figure 5A:
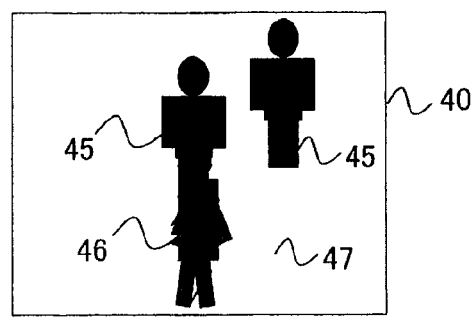
FIGS. 5A and 5B are views showing an example of an image on which an individual region detection unit performs region segmentation.
Figure 5B:
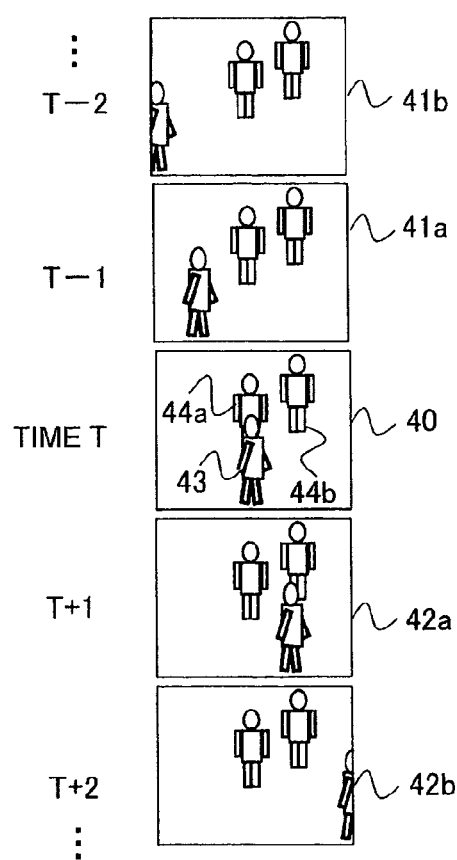

FIGS. 5A and 5B are views showing an example of an image region on which the individual region detection unit 4 performs region segmentation. FIG. 5A is a view showing an example of an input image 40, and FIG. 5B is a view showing an example of images in continuous frames obtained in time-series by the image acquisition unit 1. The individual region detection unit 4 performs region segmentation of an image based on an image feature quantity, gives attributes to respective regions, determines an attribute of a region in which the head coordinate 26 of each person on the image coordinate axes 25 is included, and detects the individual region.

Here, as the method of performing the region segmentation of an image, a method is used in which an image is segmented into a stationary attribute region (region in which an object body entering the image is in a stationary state) and a transient attribute region (region in which an object body entering the image is in a transient state) by referring to a long-term change and a short-term change in brightness value on the image.

A pixel state analysis method, which is a processing method in the individual region detection unit 4, will be described in which the input image 40 is segmented into a region 45 having a stationary attribute (ST), a region 46 having a transient attribute (TR) and a region 47 having a background attribute (BG) as shown in FIG. 5A.

FIG. 5B shows the example of the images in the continuous frames including the input image 40 at time T obtained by the image acquisition unit 1 in FIG. 1, past input images 41a and 41b at past time T−1 and T−2 before time T obtained by the image acquisition unit 1, and future input images 42a and 42b at future time T+1 and T+2 after time T obtained by the image acquisition unit 1.

Persons at time T of FIG. 5B are stationary persons 44a and 44b and a transient person 43. In the pixel state analysis method, an image is segmented into regions of attributes ST, TR and BG based on an abrupt change in brightness value (short-term change in brightness value on the image) and a transition from an unstable state to a stable state (long-term change in brightness value on the image). First, an abrupt change amount D in brightness value is uniquely determined by Expression (5).

$$D = \max\{|I_t - I_{(t-j)}|, \forall j \in [1, n]\} \quad (5)$$

In Expression (5), $I_t$ denotes the brightness value at the time T, and n denotes the use number of frames which are used for obtaining the abrupt change amount D in brightness value and are acquired at past times before the time T. In the example of FIG. 5B, n is 2. In Expression (5), when the abrupt change in brightness value occurs in a pixel, the value of the change amount D becomes large. Next, in order to grasp the transition from the unstable state to the stable state, stability S of a pixel is uniquely determined by Expression (6)

$$S = \frac{k \sum_{j=0}^{k} I_{(t+j)}^2 - \left(\sum_{j=0}^{k} I_{(t+j)}\right)^2}{k(k-1)} \quad (6)$$

In Expression (6), k denotes the use number of frames which are used for obtaining the stability S of the pixel and are acquired at future times after the time T. In the example of FIG. 5B, k is 2. In Expression (6), the stability S of the pixel is a dispersion of brightness values among frames acquired from the time T to time T+k, and S becomes small when the pixel is in a stable state.

Figure 6:
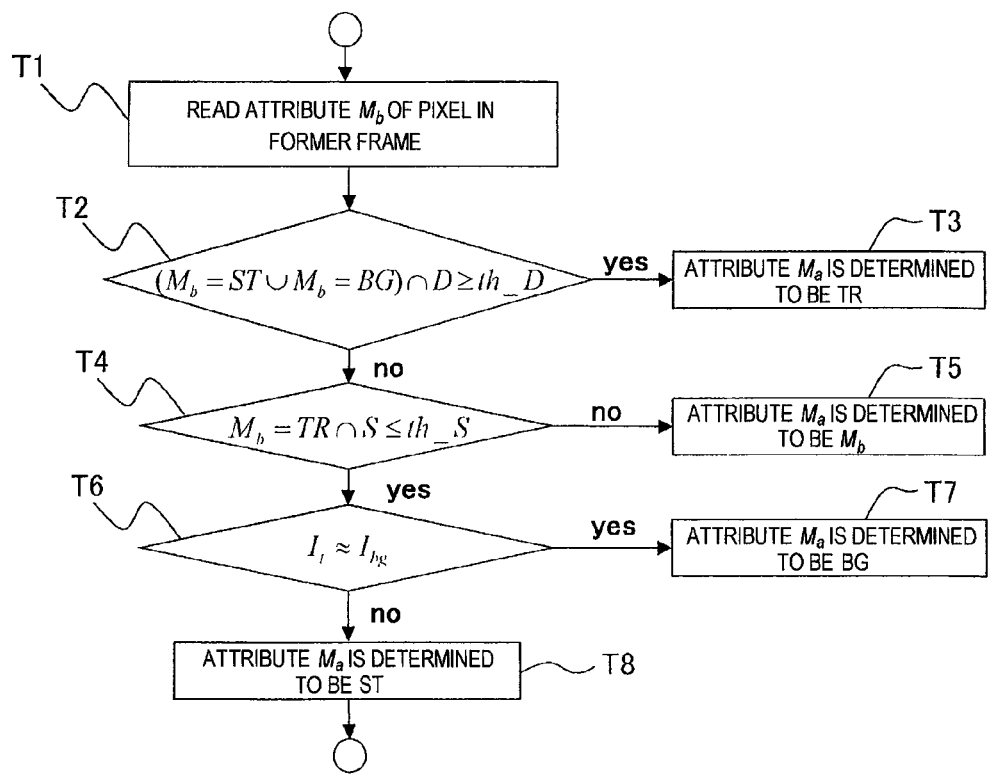
FIG. 6 is a view for explaining a flow of a region segmentation method of the individual region detection unit.

FIG. 6 is a view for explaining a flow of the region segmentation method of the individual region detection unit 4. In the pixel state analysis method, a method of giving attributes to respective pixels will be described with reference to FIG. 6. In the pixel state analysis method, the attributes to be given to the respective pixels are three attributes, that is, the stationary attribute (ST), the transient attribute (TR) and the background attribute (BG).

In the method of giving the three attributes to the respective pixels, first, the individual region detection unit 4 reads an attribute Mb of each pixel in a former frame (process T1), and it is determined whether the attribute Mb is the stationary attribute (ST) or the transient attribute (BG) and whether the abrupt change amount D in brightness value obtained by Expression (5) is a threshold th D or more (process T2). If the determination condition is satisfied (process T2, yes), the individual region detection unit 4 determines that the present pixel attribute Ma is the transient attribute (TR) (process T3), and if not satisfied (process T2, no), advance is made to process T4.

Next, the individual region detection unit 4 determines whether the attribute Mb is the transient attribute (TR) and whether the stability S of the pixel obtained by Expression (6) is a threshold th S or less (process T4). If the determination condition is not satisfied (process T4, no), the present pixel attribute Ma is determined to be the attribute Mb (process T5), and if the determination condition is satisfied (process T5, yes), advance is made to process T6.

Next, the individual region detection unit 4 determines whether a difference between a previously prepared background image brightness value $I_{bg}$ and the brightness value $I_t$ at the time T is minute (process T6). If the determination condition is satisfied (process T6, yes), the present pixel attribute Ma is determined to be the background attribute (BG) (T7), and if the determination condition is not satisfied (process T6, no), the present pixel attribute Ma is determined to be the stationary attribute (ST) (T8).

The individual region detection unit 4 performs the process from process T1 to process T8 for all pixels, and regards a pixel group of the same attribute Ma as a region, and segments the input image 40 into the region 45 of the stationary attribute (ST), the region 46 of the transient attribute (TR) and the region 47 of the background attribute (BG). Incidentally, a background image to be used is adaptively renewed so as to follow an environmental change. Besides, in the individual region detection unit 4, as the method of region segmentation, other than the pixel state analysis method, another method may be used as long as an image is segmented into regions, and attributes can be given to the respective regions.

Figure 7:
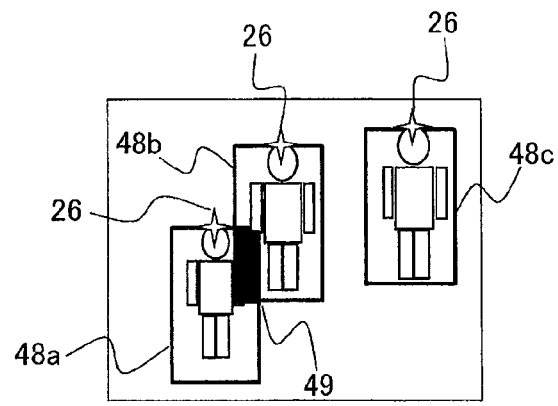
FIG. 7 is a view for explaining an example of a method other than a pixel state analysis method, in which an image is segmented into regions and an attribute is given to each of the regions.

FIG. 7 is a view for explaining an exemplary method other than the pixel state analysis method, in which an image is segmented into regions and attributes are given to the respective regions. In this exemplary method, with respect to head coordinates 26 detected by the head coordinate detection unit 2, attributes of A, B, C, . . . are sequentially given to rectangular regions 48 in each of which the head coordinate 26 is the center coordinate of the upper side, the vertical width is a human's average height and the lateral width is a human's average shoulder width, so that the image is segmented into regions 48a, 48b, 48c, . . . .

Incidentally, with respect to a region 49 to which plural attributes are given since the rectangular region 48a and the region 48b overlap each other as shown in FIG. 7, priority is given to the attribute of the rectangular region 48a containing a person having the lowest head coordinate 26 on the image coordinate axes. Other than this exemplary method, a method is conceivable in which an image is segmented into regions by using color information in the image or texture information or both information, and attributes are given to the respective regions based on the information. Then, for example, in an image photographed in a store, the image can be divided into a region having an attribute of a clerk wearing a uniform of specific color and shape and a region having an attribute of a customer in the store.

Foot Coordinate Correction Unit 5

Figure 8:
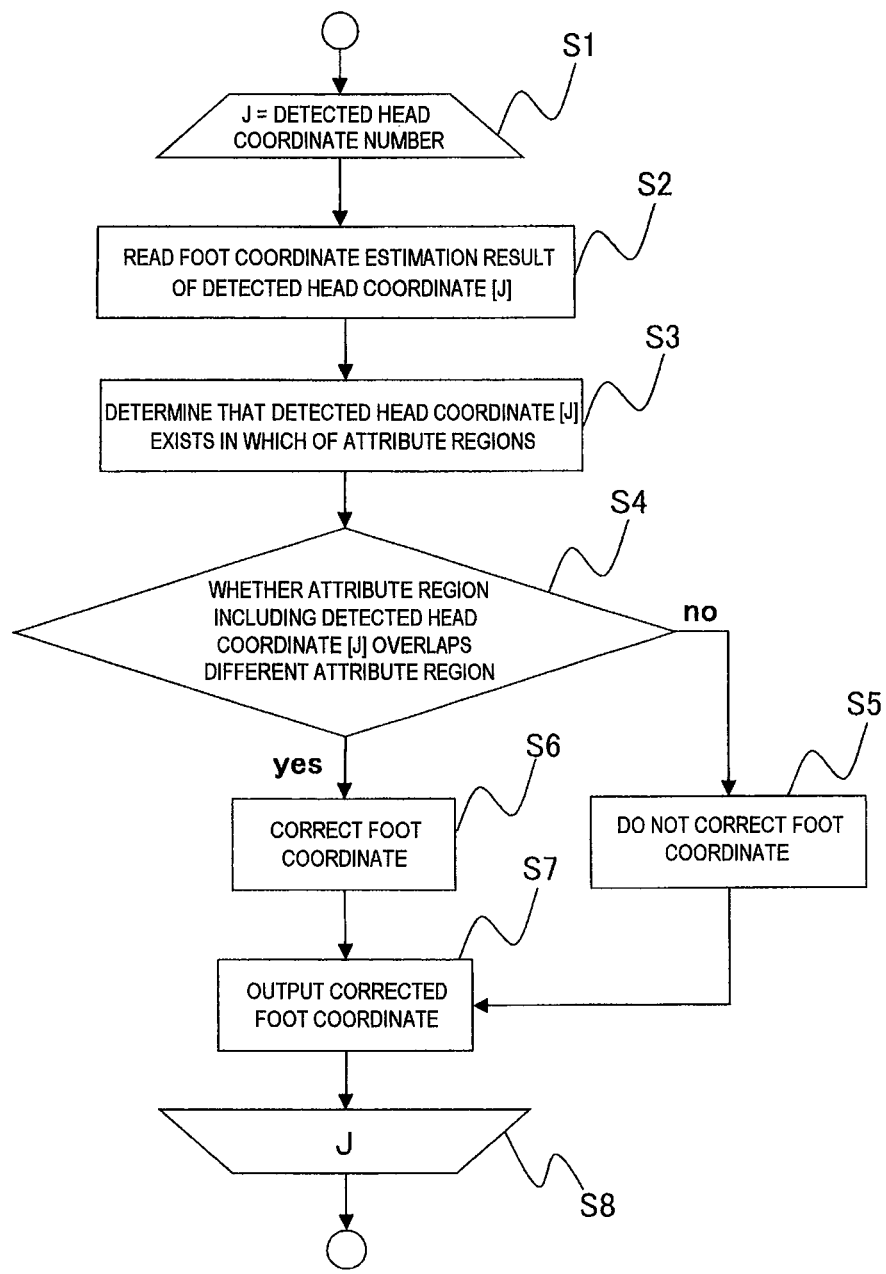
FIG. 8 is a view for explaining a flow of a foot coordinate correction unit.
Figure 9A:
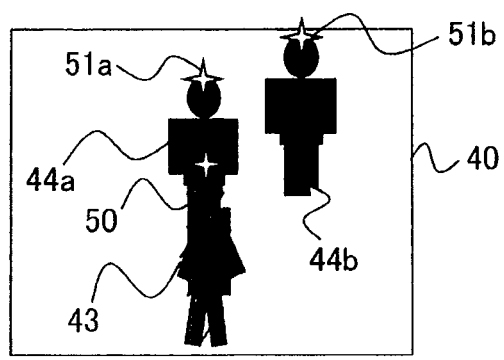
FIGS. 9A and 9B are views showing an example of an image in which the foot coordinate correction unit corrects a foot coordinate.
Figure 9B:
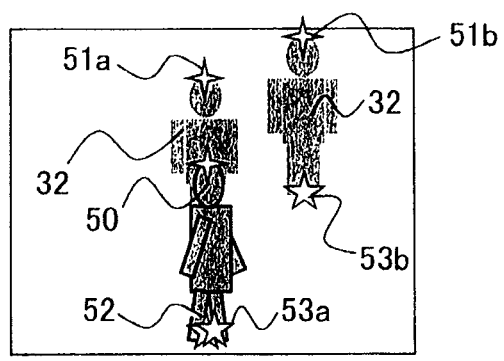

FIG. 8 is a view for explaining a flow of the foot coordinate correction unit 5. FIGS. 9A and 9B are views showing an example of an image in which the foot coordinate correction unit 5 corrects a foot coordinate. FIG. 9A is a view showing a state in which attributes are given by the individual region detection unit 4, and FIG. 9B is a view for explaining that the foot coordinate correction unit 5 corrects the foot coordinate estimated by the foot coordinate estimation unit 3.

The outline of FIG. 8 will be first described. With respect to a transient person 43 and stationary persons 44a and 44b on an input image 40 shown in FIG. 9A, the foot coordinate correction unit 5 can correct foot coordinates 52, 53a and 53b shown in FIG. 9B and estimated by the foot coordinate estimation unit 3 based on head coordinates 50, 51a and 51b detected by the head coordinate detection unit 2 when necessary (loop from process S1 to process S8).

The contents of the loop from process S1 to process S8 will be described. First, the foot coordinate correction unit 5 reads the foot coordinate estimated by the foot coordinate estimation unit 3 from the head coordinate detected by the head coordinate detection unit 2 (process S2). Next, the foot coordinate correction unit determines that the detected head coordinate exists in which of the region 45 of the stationary attribute (ST) and the region 46 of the transient attribute (TR) shown in FIG. 5A and detected by the individual region detection unit 4 (process S3). Incidentally, since the head coordinate always exists in a body region 32 (see FIG. 9B), the head coordinate is not determined to be the background attribute region 47 by process S3.

Next, the foot coordinate correction unit 5 determines whether a person whose head coordinate exists in a region to which the stationary or transient attribute is given in process S3 overlaps a person whose head coordinate exists in a region to which a different attribute is given (process S4). If overlap does not occur (process S4, no), the foot coordinate correction unit 5 does not correct the foot coordinate received in process S2 (process S5). If overlap occurs (process S4, yes), the foot coordinate correction unit corrects the foot coordinate received in process S2 by a specified method described below (process S6). Finally, the foot coordinate correction unit 5 outputs the foot coordinate received in process S5 or process S6 as the foot coordinate (process S7). Hereinafter, the process of process S4 and process S6 in which detailed explanation is necessary will be described.

Figure 10A:
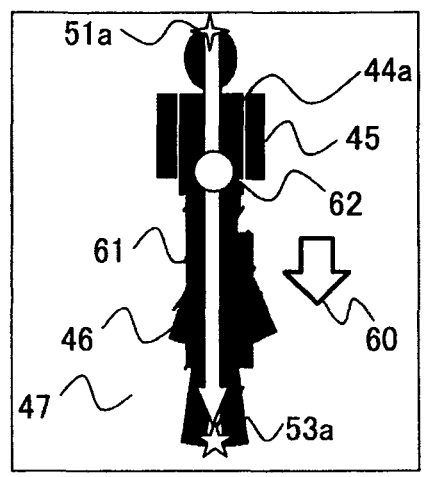
FIGS. 10A and 10B are views for explaining process S4 of the foot coordinate correction unit.
Figure 10B:
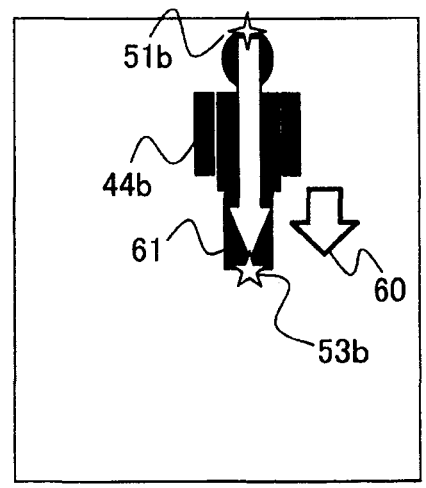

FIGS. 10A and 10B are views for explaining process S4 of the foot coordinate correction unit 5. A description will be made by referring to FIG. 8 as needed. In the image in which the input image 40 is segmented by the individual region detection unit 4 into the region 45 of the stationary attribute, the region 46 of the transient attribute, and the region 47 of the background attribute, FIG. 10A shows an image in which the stationary person 44a is mainly extracted from FIG. 9A, and FIG. 10B shows an image in which the stationary person 44b is mainly extracted from FIG. 9A.

With respect to the stationary person 44a of FIG. 10A, in process S4, the foot coordinate correction unit 5 extends a straight line 61 from the head coordinate 51a detected by the head coordinate detection unit 2 in a vertically downward direction 60 obtained by the foot coordinate estimation unit 3, and investigates attributes of respective pixels on the straight line 61 while the head coordinate 51a is made the start point.

In process S4, when the attributes of the respective pixels on the straight line 61 are investigated while the head coordinate 51a is the start point and the foot coordinate 53a is the endpoint, if a pixel 62 is detected which has an attribute (transient attribute (TR) in the example of FIG. 10A) different from an attribute (stationary attribute (ST) in the example of FIG. 10A) of a region in which it is determined in process S3 that the head coordinate 51a exists, the foot coordinate correction unit 5 determines that the person of the head coordinate 51a overlaps a person existing in the region of the different attribute.

On the other hand, if the pixel 62 is not detected (FIG. 10B), the foot coordinate correction unit 5 determines that the person of the head coordinate 51b does not overlap the person existing in the region of the different attribute. Incidentally, in the example of FIG. 10A, the person in the region of the transient attribute (TR) overlaps the person in the region of the stationary attribute (ST). However, also when the person in the region of the stationary attribute (ST) overlaps the person of the region of the transient attribute (TR), it is determined by the loop of process S1 to process S8 that the persons in the regions of the different attributes overlap each other.

Figure 11:
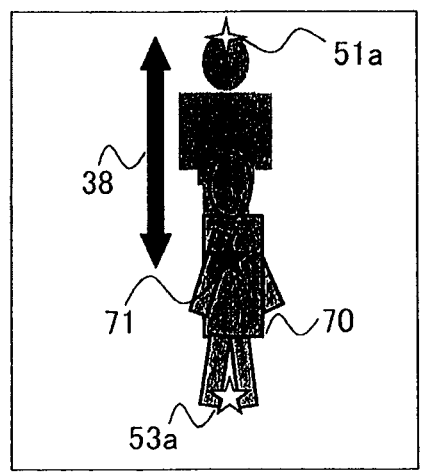
FIG. 11 is a view for explaining process S6 of the foot coordinate correction unit.

FIG. 11 is a view for explaining process S6 of the foot coordinate correction unit 5. A description will be made by referring to FIG. 8 as needed. If it is determined in process S4 that the person of the head coordinate 51a shown in FIGS. 9A and 9B overlaps the person existing in the region of the different attribute, in process S6, the foot coordinate 53a estimated by the foot coordinate estimation unit 3 is corrected to a corrected foot coordinate 71 by a method described below based on the head coordinate 51a and the average height 38.

Process S6 of the foot coordinate correction unit 5 will be described with reference to the head coordinate 51a detected by the head coordinate detection unit 2 in FIG. 11, a human body candidate region 70 detected by the background subtraction or the like, and the foot coordinate 53a estimated from the head coordinate 51a by the foot coordinate estimation unit 3. In process S6, a head coordinate $(x_{wh}, y_{wh}, z_{wh})$ on the real world coordinate axes 39 (see FIG. 4B) with respect to the head coordinate 51a is uniquely determined by Expression (1) and Expression (2), the real number α can be easily obtained when $z_{wh}$ is determined to be an arbitrary real number of 1 or more.

Here, $(x_{wh}, y_{wh}, z_{wh})$ of the head coordinate 36 on the real world coordinate axes 39 shown in FIG. 4B is uniquely determined from the real number α obtained while $z_{wh}$ is the average height 38, and $(x_{wf}, y_{wf}, z_{wf})$ of the coordinate existing in the vertical downward direction from $(x_{wh}, y_{wh}, z_{wh})$ of the head coordinate 36 on the real world coordinate axes 39 is obtained by Expression (4). The coordinate $(x_{wf}, y_{wf}, z_{wf})$ is the coordinate existing in the vertical downward direction by the average height 38 from the head coordinate 36 on the real world coordinate axes 39. Further, coordinate $(u_f, v_f)$ on the image coordinate axes 25, which is obtained by the inverse transform of Expression (2) and Expression (1) with respect to the coordinate $(x_{wf}, y_{wf}, z_{wf})$, indicates the foot coordinate on the image coordinate axes 25 of the coordinate which is vertically lower than the head coordinate 51a shown in FIG. 9A by the average height 38 on the real world. This coordinate is made the corrected foot coordinate 71 in process S6.

Incidentally, the average height 38 can be obtained by using camera parameter values from the average height of previously determined target persons. Besides, as the detection method of the corrected foot coordinate 71, other than the method of using the average height, another method may be used as long as the rough foot position of the person can be detected without using the human body candidate region. For example, foot coordinates obtained by the foot coordinate estimation unit 3 before persons overlap and the head coordinates are stored for the respective persons, and the persons are tracked in the continuous frames, and when the persons overlap each other, the rough foot coordinate is detected from the head coordinate at the overlap by using the information of the foot coordinate and the head coordinate before the overlap of the persons. By this, the detection accuracy of the foot coordinate can be raised.

Foot Coordinate Region Inside/Outside Determination Unit 6

Figure 12A:
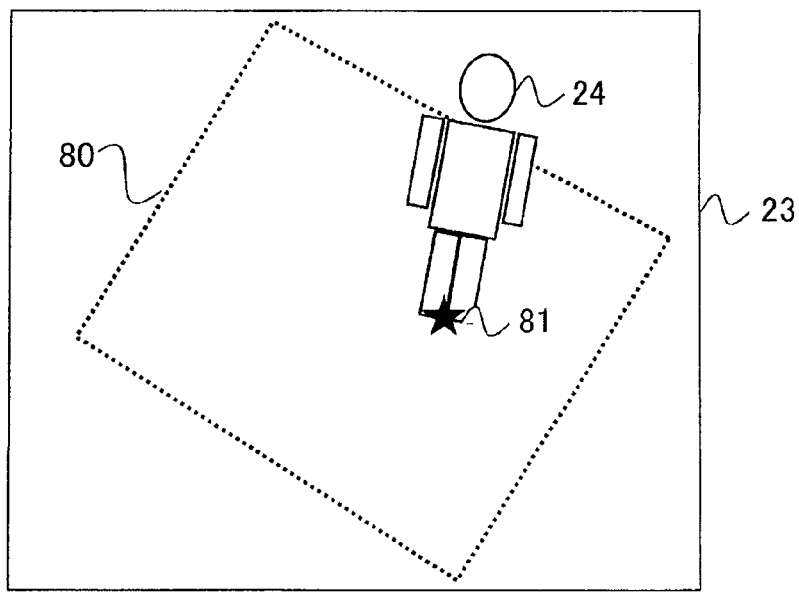
FIGS. 12A and 12B are views for explaining a foot coordinate region inside/outside determination unit.
Figure 12B:
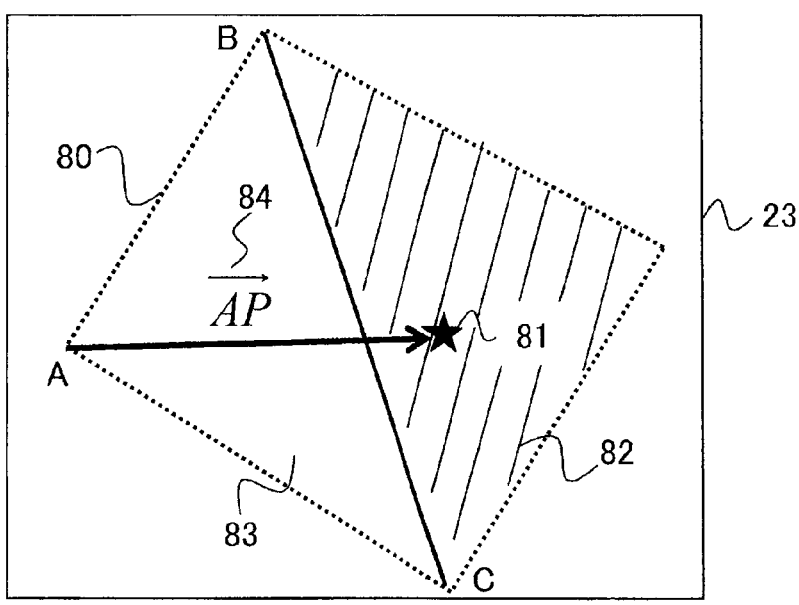

FIGS. 12A and 12B are views for explaining the foot coordinate region inside/outside determination unit 6. FIG. 12A is a view showing a counting target region 80 set in the input image 23, and FIG. 12B is a view for explaining the foot coordinate region inside/outside determination unit 6 of the embodiment. First, the foot coordinate region inside/outside determination unit 6 divides the counting target region 80 (detection region) previously set in the input image 23 shown in FIG. 12A into triangular regions 82 and 83 as in the example shown in FIG. 12B. In FIG. 12B, when respective apexes of the one triangular region 83 are made A, B and C, and the apex A is made the start point, a position vector 84 of a corrected foot coordinate 81 detected by the foot coordinate correction unit 5 is uniquely determined by Expression (7).

$$\vec{AP} = s\vec{AB} + t\vec{AC} \quad (7)$$

where, s and t denote real numbers.

In Expression (7), if the real numbers s and t satisfy Expression (8), it is determined that the corrected foot coordinate 81 is a point in the triangular ABC region.

$$\left.\begin{array}{l} s \geq 0 \\ t \geq 0 \\ s + t \leq 1 \end{array}\right\} \quad (8)$$

The foot coordinate region inside/outside determination unit 6 uses Expression (7) and Expression (8) for the respective triangular regions and determines whether or not the corrected foot coordinate 81 is a point in the triangular region. If it is determined that the corrected foot coordinate is the point in one of the triangular regions, the foot coordinate region inside/outside determination unit determines that the corrected foot coordinate 81 exists in the counting target region 80.

Incidentally, in the example of FIG. 12B, since the shape of the counting target region 80 is square, the region is divided into two parts. However, when the counting target region 80 is n-polygonal, the region is divided into (n–2) triangular regions, and when the region is circular, the region is divided into plural triangular regions by using approximation or the like. Besides, as the region inside/outside determination method, other than the method of using the vector, another method may be used as long as it is determined whether a certain point exists in a polygon or a circle.

People Counting Unit 7

The people counting unit 7 counts the number of the corrected foot coordinates 81 determined to exist in the counting target region 80 shown in FIGS. 12A and 12B by the foot coordinate region inside/outside determination unit 6.

In the embodiment 1, by the functional structure described above, a determination (for example, process S4 of FIG. 8) is made based on the image feature quantity as to whether a passenger (for example, the transient person 43 of FIG. 5B) overlaps a stayer (for example, the stationary person 44a of FIG. 5B), and the method of foot estimation can be changed by the presence or absence of the occurrence of overlap (for example, process S5, process S6 of FIG. 8). By this, at the quiet time when there are a small number of overlaps between the passenger and the stayer, the accurate foot positions are estimated, and the number of persons is counted with high accuracy. At the crowded time when there are a large number of overlaps between the passenger and the stayer, the rough foot positions are estimated, and the number of persons can be roughly counted.

Besides, in the embodiment 1 of the invention, by the functional structure described above, the number of persons of a specific attribute (for example, the stationary attribute (ST), the transient attribute (TR)) can be counted.

As an application example of the embodiment, elevator group management will be described. Compatibility of people counting between the quiet time and the crowded time, which is the problem of the embodiment, is required also in, for example, the elevator group management. In the elevator group management, the information of the number of persons is used, and the number of allocated elevators and the timing are controlled, so that the improvement of convenience, such as shortening of waiting time of users, and the energy saving, such as suppression of power consumption, are realized.

One function of the elevator group management is such a function that, based on the number of waiting persons in an elevator hall of each floor obtained by the people counting technique and the previously obtained allowable number of elevator occupants, it is determined whether an elevator is stopped at each floor or is made to pass, and elevator allocation is efficiently controlled. In this function, it is important that especially when the allowable number of elevator occupants is small, a floor at which the elevator is stopped and a floor which the elevator is made to pass are accurately determined, and the efficiency of elevator allocation is improved.

Thus, in a quiet state where the number of waiting persons on the elevator hole is small, people counting with high accuracy is required. On the other hand, in a crowded state where the number of waiting persons on the elevator hole is large, if the rough number of persons can be counted, it is possible to determine whether the elevator is stopped or is made to pass when the allowable number of elevator occupants is small. Thus, people counting with high accuracy is not required as compared with the quiet state. Thus, the people counting technique capable of covering both the quiet time and the crowded time is required.

That is, in this embodiment, when the number of only the stayers as the stationary persons is counted, the number of persons is measured with high accuracy at the quiet time when overlap with passengers is small, and the number of persons can be roughly counted at the crowded time when overlap with passengers is large. When this is applied to the system for counting the number of waiting persons in the elevator hall, the number of waiting persons can be counted at the quiet time and the crowded time, and the counted number of persons can be used for the elevator operation control.

Besides, as an example other than the elevator operation control, the camera 20 photographs an inside of a store, and the people counting unit 7 counts the number of persons in the store. This can be appropriately applied to a clerk arrangement plan at the quiet time and the crowded time.

Incidentally, the foot coordinate correction unit 5 may delete the head coordinate detected by the head coordinate detection unit 2 from the distribution of regions of each attribute. As a condition of the distribution of the regions in which the head coordinate is deleted, for example, when the attributes of the pixels on the straight line 61 shown in FIG. 10A are investigated in process S4, if the attributes of the pixels are frequently changed, the overlap degree of regions different in attribute clearly deviates from the range in which persons overlap each other in the real world. Therefore, it is determined that the distribution of the regions is abnormal, and the head coordinate included in the region of the attribute is deleted. By this, the accuracy of people counting can be raised.

Besides, the foot coordinate correction unit 5 may add a head coordinate by an assist unit of the head coordinate detection unit 2 from the distribution of regions of each attribute. As the assist unit of the head coordinate detection unit 2, there is a method of adding a detection frame 27 which is not used since the head coordinate detection unit 2 determines that the reliability of being the head is low. Alternatively, there is a method of newly adding a detection frame 27 detected from a simple image feature such as a corner point. Besides, as the condition of the distribution of regions to which the head coordinate is added, for example, when the attributes of pixels on the straight line 61 of FIG. 10A are investigated in process S4, if a pixel of the attribute 46 different from the attribute 45 of the head coordinate is found very early and the attribute 46 of the pixel on the straight line 61 is not changed for a while thereafter, it is determined that persons overlap each other, and even if the head coordinate does not exist in the region of the attribute 46, the head coordinate is added into the region. By this, the accuracy of people counting can be raised.

In this embodiment, in the foot coordinate correction unit 5, although the description is made on the case in which the one transient person 43 overlaps the stationary person 44a in FIG. 10A, no limitation is made to this.

Figure 17A:
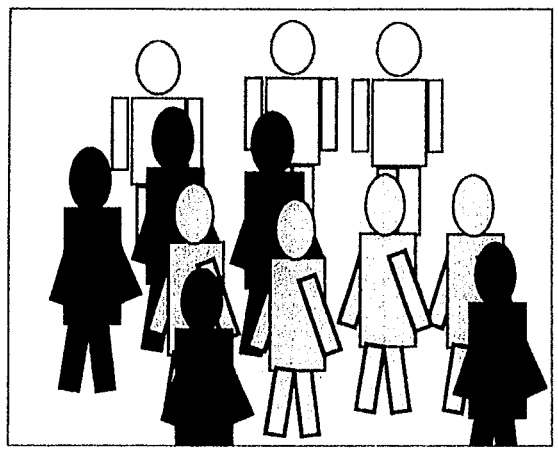
FIGS. 17A and 17B are views showing an example of a crowded time state.
Figure 17B:
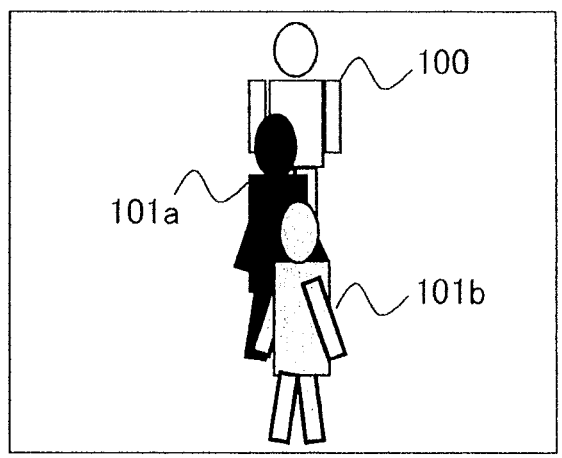

FIGS. 17A and 17B are views showing an example of a state at a crowded time. FIG. 17A is a view showing the example of the state at the crowded time, and FIG. 17B is a view in which a part of FIG. 17A is extracted for explanation. FIG. 17B shows a case where two transient persons 101a and 101b exist in front of a stationary person 100. Even when the transient persons 101a and 101b overlap the stationary person 100, the foot coordinate of the stationary person 100 can be corrected by a similar process to that of FIG. 8.

According to this embodiment, the people counting device estimates the foot coordinate by the foot coordinate estimation unit 3, and when the foot coordinate correction unit 5 determines that persons overlap each other, the previously estimated foot coordinate is corrected and is outputted. When the foot coordinate correction unit 5 determines that persons do not overlap each other, the previously estimated foot coordinate can be outputted. As a result, the number of persons is counted with high accuracy at the quiet time when there are a small number of overlaps between persons, and the rough number of persons can be counted at the crowded time when there are a large number of overlaps between persons. Incidentally, the overlap between persons is determined according to whether an attribute region overlaps a different attribute region.

Embodiment 2

Figure 13:
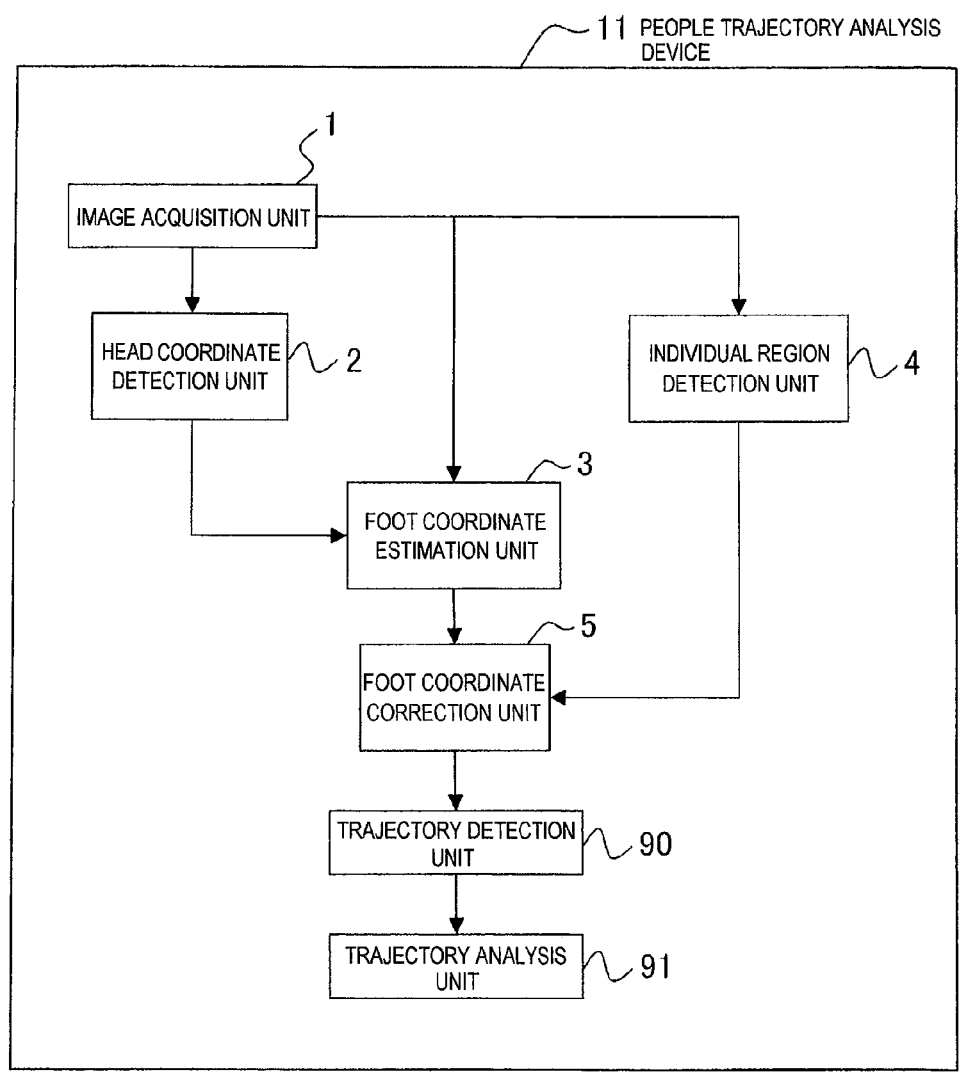
FIG. 13 is a view showing a functional block of embodiment 2 of the invention.

FIG. 13 is a view showing a functional block of embodiment 2 of the invention. A people trajectory analysis device 11 shown in FIG. 13 is a people trajectory analysis device to analyze the pattern of action of a person by performing image recognition of the person photographed by a camera 20 (see FIG. 2A). The same components as those of the first embodiment shown in FIG. 1 are denoted by the same reference numerals and a duplicate explanation is omitted.

The people trajectory analysis device 11 includes an image acquisition unit 1, a head coordinate detection unit 2, a foot coordinate estimation unit 3, an individual region detection unit 4, a foot coordinate correction unit 5, a trajectory detection unit 90 to detect a trajectory of a person by storing foot coordinates outputted by the foot coordinate correction unit 5 for respective frames and tracking the same person in continuous images, and a trajectory analysis unit 91 to analyze a pattern of action of the target person from the trajectory detected by the trajectory detection unit 90. Incidentally, the people trajectory analysis device 11 is realized by a calculator including an arithmetic unit to perform operations of the respective units, a main storage device and an external storage device. Hereinafter, functions of the trajectory detection unit 90 and the trajectory analysis unit 91 will be described.

Trajectory Detection Unit 90

Figure 14:
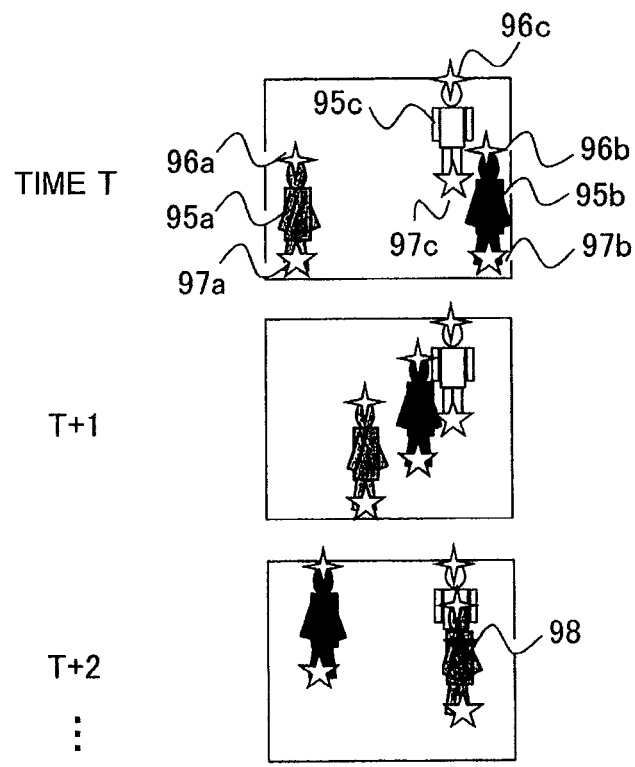
FIG. 14 is a view showing an example of an image in which a trajectory is detected by a trajectory detection unit.
Figure 15:
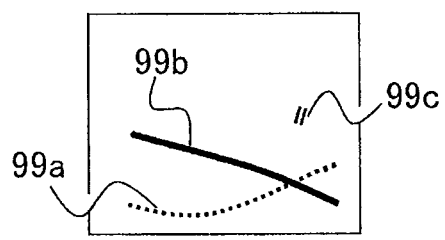
FIG. 15 is a view for explaining trajectories detected by the trajectory detection unit.

FIG. 14 is a view showing an example of images from which trajectories are detected by the trajectory detection unit 90. FIG. 15 is a view for explaining the trajectories detected by the trajectory detection unit 90. In continuous frames of FIG. 14, three persons 95a, 95b and 95c are detected in the images. The detected person 95a has a head coordinate 96a detected by the head coordinate detection unit 2 and a foot coordinate 97a estimated by the foot coordinate estimation unit 3. Similarly, the person 95b has a head coordinate 96b detected by the head coordinate detection unit 2 and a foot coordinate 97b estimated by the foot coordinate estimation unit 3. The person 95c has a head coordinate 96c detected by the head coordinate detection unit 2 and a foot coordinate 97c estimated by the foot coordinate estimation unit 3.

Incidentally, at time T+2, the person 95b has a foot coordinate 98 corrected by the foot coordinate correction unit 5.

In the trajectory detection unit 90, the foot coordinates of the same person outputted by the foot coordinate correction unit 5 from the head coordinates are stored for respective frames, and those coordinates are connected, so that a trajectory 99a of the person 95a, a trajectory 99b of the person 95b, and a trajectory 99c of the person 95c are outputted. Incidentally, a technique to determine the same person for the respective frames can be realized by using an image feature quantity of a head used when the head coordinate detection unit 2 detects the head coordinate, or attribute information of a region where the person exists.

Trajectory Analysis Unit 91

Figure 16:
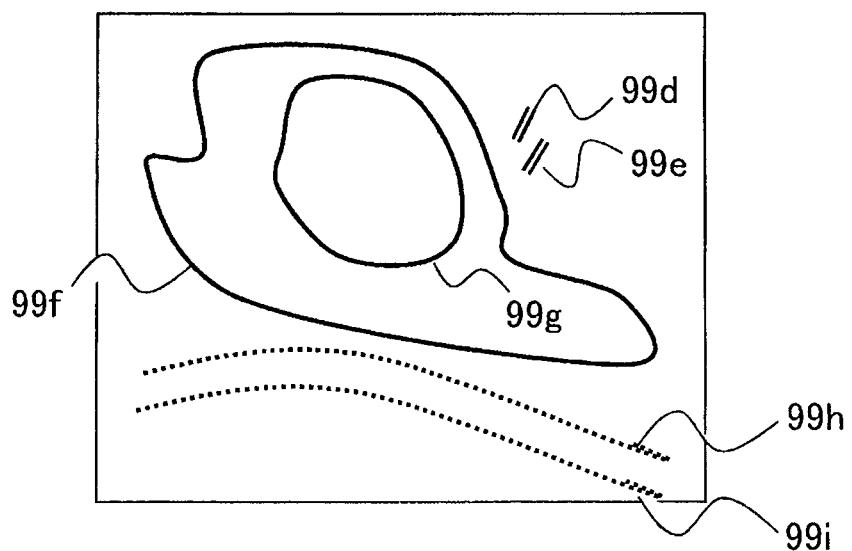
FIG. 16 is a view for explaining a trajectory analysis unit.

FIG. 16 is a view for explaining the trajectory analysis unit. The trajectory analysis unit 91 regards the trajectory detected by the trajectory detection unit 90 as a collection of point groups on the image coordinates, and determines the action pattern of a person from the change in coordinate value. For example, a person acting to draw a trajectory 99d or a trajectory 99e shown in FIG. 16 in which a movement between continuous frames is very shorter than usual, or a person acting to draw a trajectory 99f or a trajectory 99g which always falls in the image or in a specific region of the image is determined to stay in a specific range (specified range). Plural persons acting to draw the same trajectories, such as the trajectory 99d and the trajectory 99e, or a trajectory 99h and a trajectory 99i, are determined to act in groups.

That is, the trajectory analysis unit 91 detects the existence of persons acting in groups, counts the number of detected persons in each of the groups, and acquires the number of groups in the image and the number of persons in a group.

Besides, as a specific application example, the camera 20 (imaging device) (see FIG. 2A) photographs an elevator hall, and the trajectory analysis unit 91 detects the existence of a person staying in a specified range and measures a waiting time of the detected person. By this, basic data for elevator operation control can be obtained.

In the embodiment 2, by the functional structure described above, it is determined whether overlap occurs between persons based on an image feature quantity. A method of foot estimation is changed according to the presence or absence of occurrence of the overlap, and the trajectory is detected from the foot position. Thus, at the quiet time when there are a small number of overlaps between persons, the trajectory is accurately detected, and the action of a person is analyzed with high accuracy. At the crowded time when there are a large number of overlaps between persons, an average trajectory is detected and the action of a person is roughly analyzed.

The people counting device 10 of the embodiment and the people trajectory analysis device 11 can be applied to a monitoring video integrating management, elevator group management or the like.

What is claimed is:

1. A people counting device comprising:
    an image acquisition unit configured to acquire an image from an imaging device;
    a head coordinate detection unit configured to detect a head coordinate of a target person from the image;
    a foot coordinate estimation unit configured to estimate a foot coordinate of the target person from the detected head coordinate;
    an individual region detection unit configured to perform region segmentation of the image and to give an attribute to each of regions;
    a foot coordinate correction unit configured to determine whether the target person overlaps another person based on the given attribute and to correct the foot coordinate of the target person estimated by the foot coordinate estimation unit when the persons are determined to overlap each other;
    a foot coordinate region inside/outside determination unit configured to determine whether the foot coordinate exists in a detection region set in the image; and
    a people counting unit configured to count foot coordinates determined to exist in the detection region by the foot coordinate region inside/outside determination unit.

2. The people counting device according to claim 1, wherein the individual region detection unit gives a stationary attribute indicating a stationary state and a transient attribute indicating a moving state based on a time change in brightness value on the image when the region segmentation of the image is performed.

3. The people counting device according to claim 1, wherein the foot coordinate correction unit corrects the foot coordinate of the target person based on the head coordinate of the target person and an average height.

4. The people counting device according to claim 1, wherein the foot coordinate correction unit determines whether a distribution of the regions of the respective attributes is abnormal, and deletes the head coordinate detected by the head coordinate detection unit when the distribution is determined to be abnormal.

5. The people counting device according to claim 1, wherein the foot coordinate correction unit determines whether a head exists from a distribution of the regions of the respective attributes, and newly adds a head coordinate when determines that the head exists.

6. The people counting device according to claim 1, wherein
when the target person is determined not to overlap another person, the foot coordinate correction unit stores the detected head coordinate and the foot coordinate and tracks the person in continuous frames, and
when the target person is determined to overlap another person, the foot coordinate correction unit corrects based on the stored head coordinate and the foot coordinate.

7. The people counting device according to claim 1, wherein
the imaging device photographs an elevator hall, and
the people counting unit counts the number of persons in the elevator hall.

8. The people counting device according to claim' 1, wherein
the imaging device photographs an inside of a store, and
the people counting unit counts the number of persons in the store.

9. A people trajectory analysis device comprising:
an image acquisition unit configured to acquire an image from an imaging device;
a head coordinate detection unit configured to detect a head coordinate of a target person from the image acquired by the image acquisition unit;
a foot coordinate estimation unit configured to estimate a foot coordinate of the target person from the detected head coordinate;
an individual region detection unit configured to perform region segmentation of the image and to give an attribute to each of regions;
a foot coordinate correction unit configured to determine whether the target person overlaps another person based on the attribute and to correct the foot coordinate of the target person estimated by the foot coordinate estimation unit when the persons are determined to overlap each other;
a trajectory detection unit configured to store the foot coordinate for each frame and to detect a trajectory of the target person based on the stored foot coordinate; and
a trajectory analysis unit configured to analyze an action pattern of the target person from the trajectory of the target person.

10. The people trajectory analysis device according to claim 9, wherein
the imaging device photographs an elevator hall, and
the trajectory analysis unit detects existence of a person staying in a specified range and measures a waiting time of the detected person.

11. The people trajectory analysis device according to claim 9, wherein the trajectory analysis unit detects existence of persons acting in groups, counts the number of the detected persons for each of the groups, and acquires the number of the groups in the image and the number of the persons in each of the groups.

* * * * *